Figures 4A, 4B, 4C, 4D:
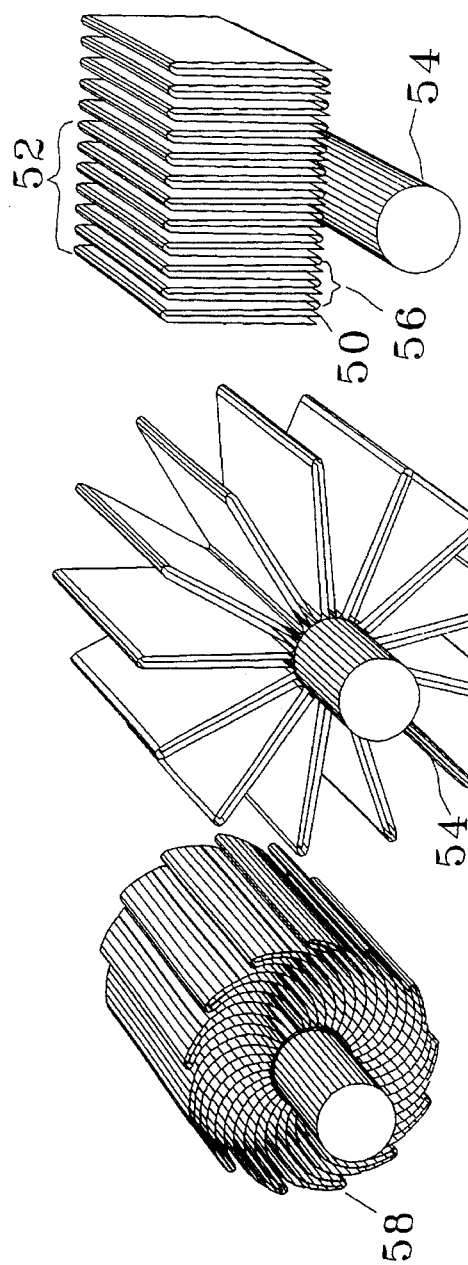

United States Patent [19]

Schneider

[11] Patent Number: 5,460,720

[45] Date of Patent: Oct. 24, 1995

[54] PLEATED MEMBRANE CROSSFLOW FLUID SEPARATION DEVICE

[76] Inventor: Burnett M. Schneider, 1252 N. Brownslake Rd., Burlington, Wis. 53105

[21] Appl. No.: 105,801

[22] Filed: Aug. 12, 1993

[51] Int. Cl.[6] .................................................. B01D 63/14
[52] U.S. Cl. ...................................... 210/321.86; 210/487
[58] Field of Search ................................ 210/487, 493.5, 210/493.1, 486, 321.77, 321.86

[56] References Cited

U.S. PATENT DOCUMENTS 3,401,798  9/1968  Nyrop ......................................... 210/321

Primary Examiner—Frank Spear

[57] ABSTRACT

A fluid separation device, utilizing tubular or flat sheet membrane materials, bounded on the membrane side of the sheet by a sheet of a porous feed spacer material, and bounded on the support side of the membrane sheet by an optional porous permeate backing material, to facilitate the flow of fluids. The layered assembly is formed into multiple pleated thin flat channels, surrounding a solid center rod mandrel, glued at the ends, wrapped with a porous sheet material, taped, and sealed into a tubular shell. The fluid to be separated flows into one end of the pleated element, and discharges from the opening at its opposite end in a concentrated form. The fluid passes through the membrane in a purified form and discharges from an opening in the side of the tubular shell.

3 Claims, 7 Drawing Sheets

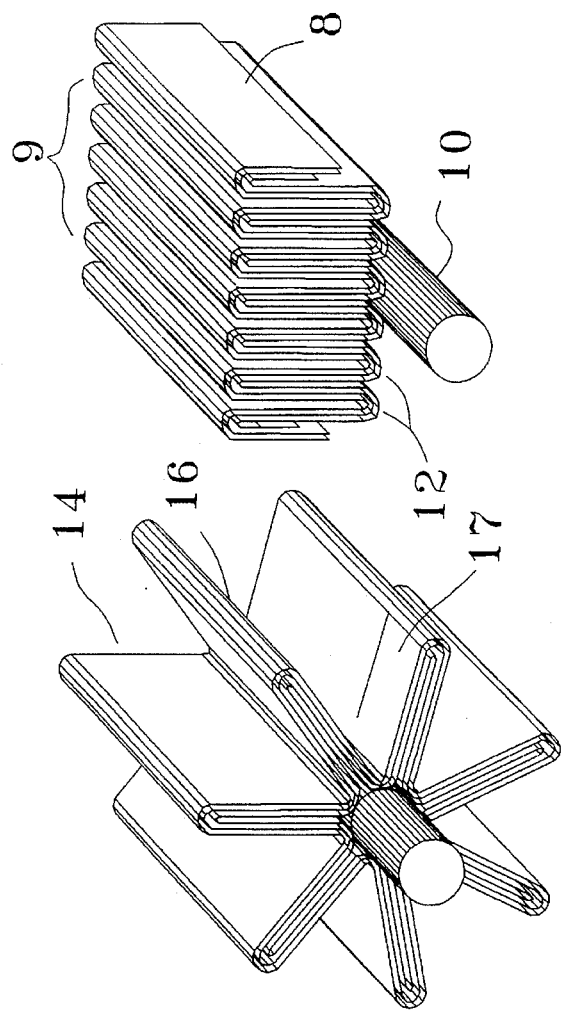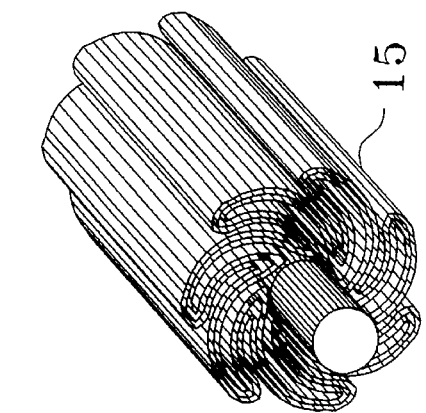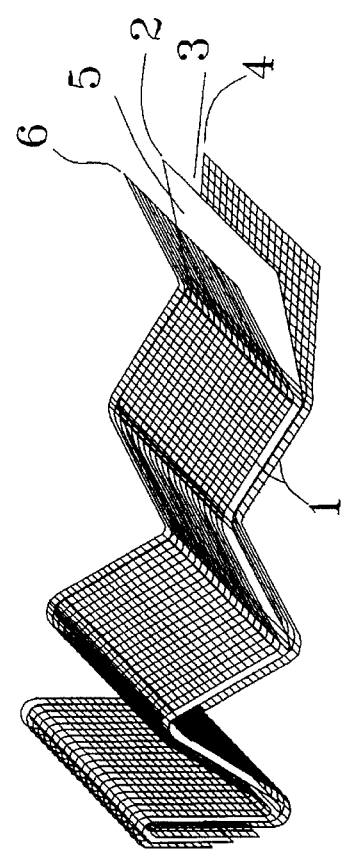

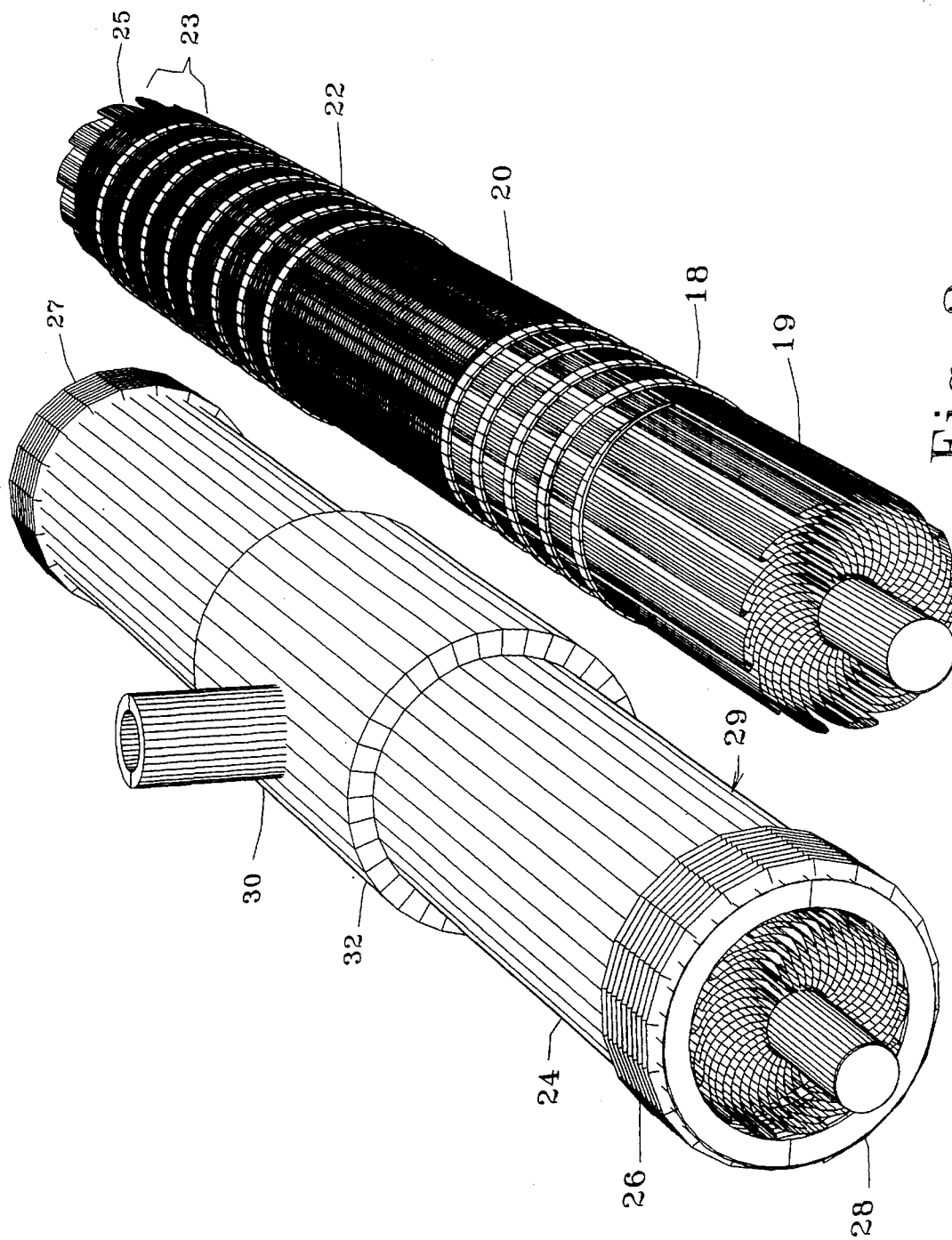

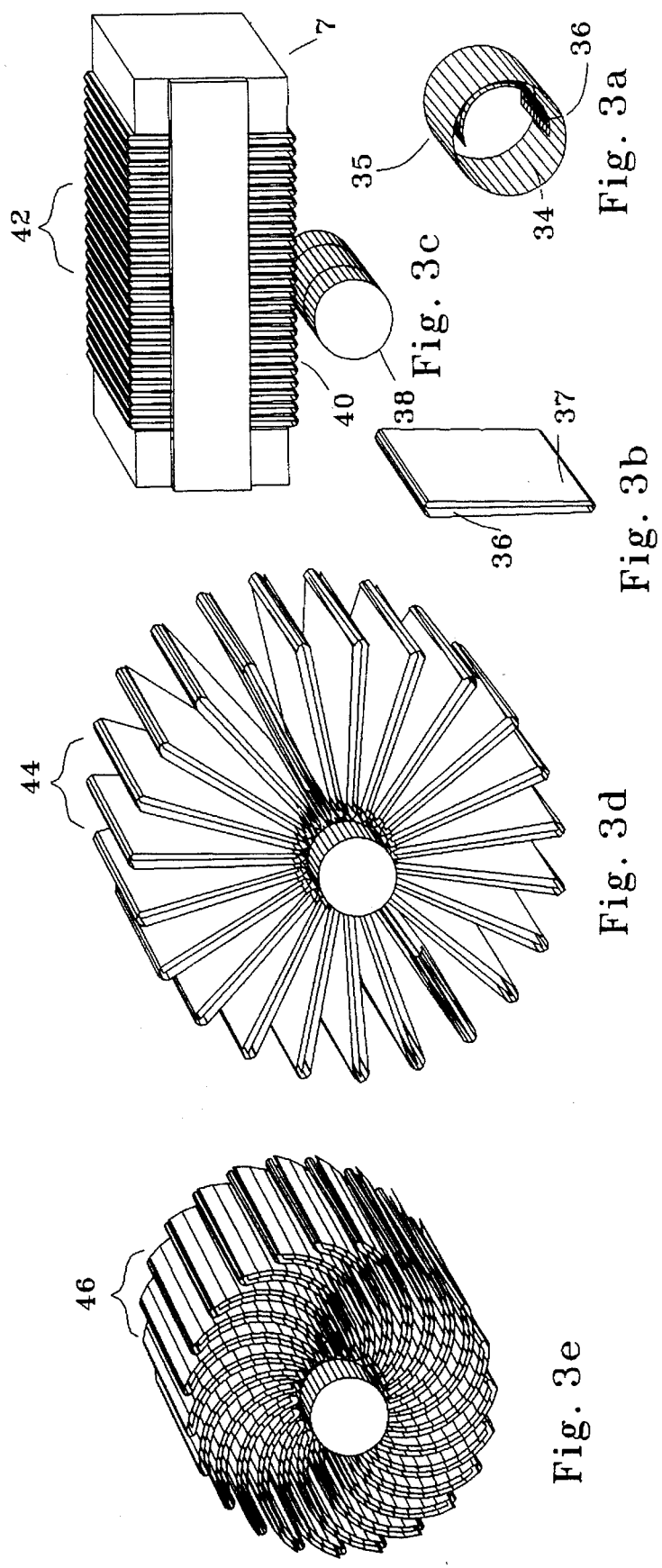

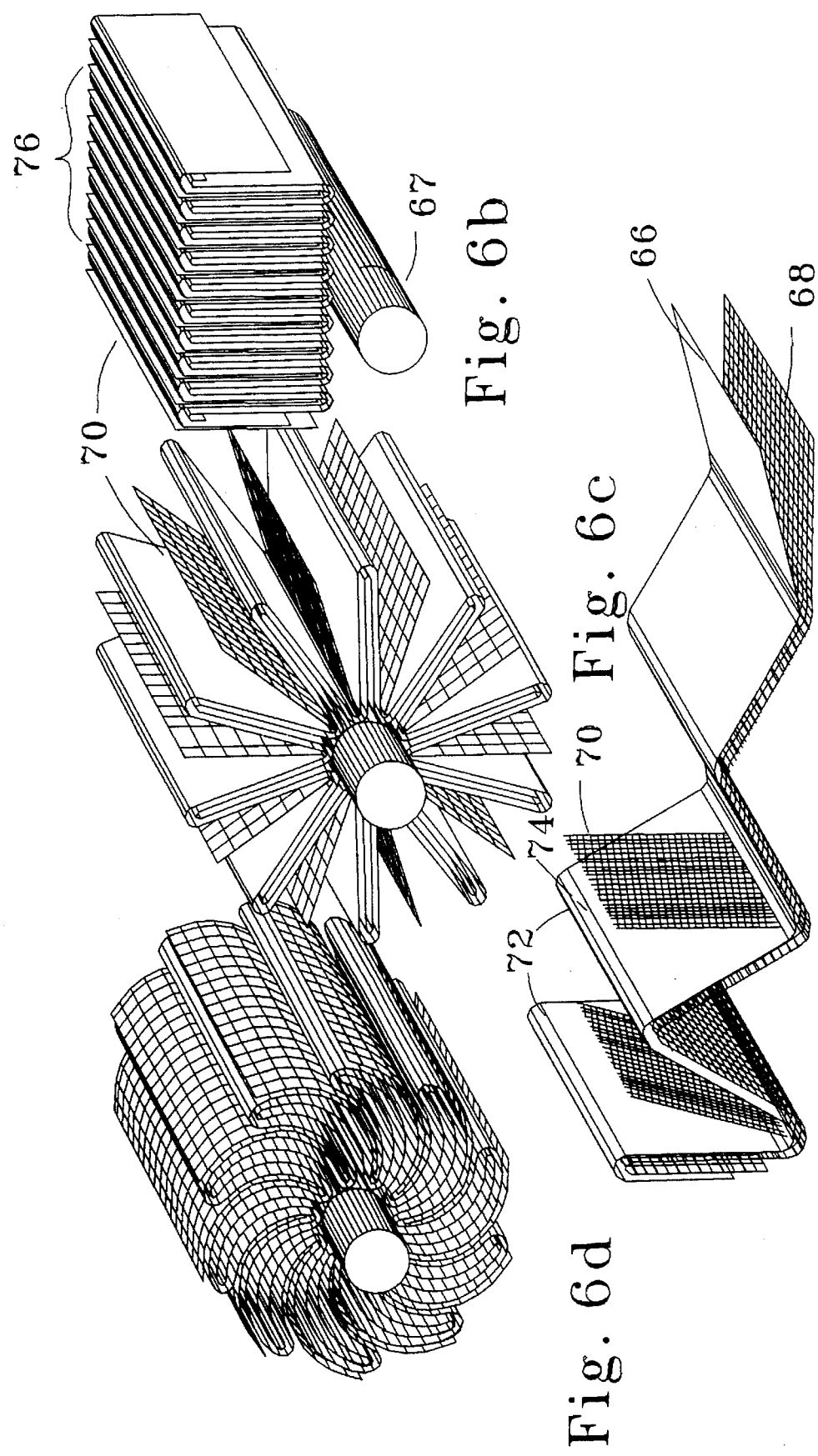

PLEATED MEMBRANE CROSSFLOW FLUID SEPARATION DEVICE

BACKGROUND-FIELD OF INVENTION

This invention relates to fluid separation devices utilizing tubular or pleated flat sheet membrane materials, bounded by porous feed spacer materials, and by an optional porous permeate backing materials, assembled around a solid rod mandrel and sealed into a tubular shell.

BACKGROUND-TECHNOLOGY

By definition, a fluid separation membrane is a porous semipermeable wall or boundary layer separating two fluids, yet allowing communication between the solutions via the fluid molecules, including dissolved or undissolved solid species contained within the fluid to be purified. A driving force, which can be a pressure difference between the two fluids, forces the fluid through the membrane. The membrane retains molecules larger than the effective pore diameter of the membrane on its feed side. A portion of the fluid molecules, along with other species smaller than the pore diameter, pass through it and into the diluted or permeate side of the membrane. The fluid can be water, organic liquids, or gases. Other forces such as concentration differences, temperature differences, electrical fields, chemical reactions, and the affinity of dissolved molecular species for different fluids, can provide the driving force to effect a separation. Membrane separation devices are constructed to support the membrane, allow the passage of two or more fluids, and to maintain the separation of the fluids, so that the only communication between the fluids is through the membrane surface. Membrane devices are constructed from either flat sheet or tubular membrane materials.

BACKGROUND-DESCRIPTION OF PRIOR ART

Tubular membranes range in size from large, one inch or larger diameter tubes, to hollow fine fibers. The feed flow can pass over the outside or flow through the inside of the tube. The devices or elements or modules are generally composed of bundles of tubes or fibers, inserted into a tubular shell, and sealed at both ends of the tubes by potting with a polymer. With the active membrane on the inside of the tube, the fluid to be separated flows into one end of the shell, into the tubes and is discharged from the opposite end of the tubes and shell. A portion of the fluid passes through the membrane and into the bundle, and discharges out of the side of the shell. With the active membrane on the outside of the tube, the fluid to be separated flows into the side of the shell at one end of the element. It flows into the bundle, is discharged from the opposite end of the bundle of tubes, and out the side of the shell. A portion of the fluid passes through the membrane, into the interior of the tubes, and discharges out of either / or both ends of the shell. Variations of the tubular devices involve arrangements where all fluids enter and exit from the ends of the shell. Fiber bundles that are U-shaped, and bundles that are sealed by O-rings, can be removed from the shell.

Devices utilizing flat sheet membranes have three basic configurations. In the first configuration, membrane sheets are stacked in layers, separated by sheets of polymers, which are cut out in their centers to expose the membranes, and contain the fluids. The assembly is compressed by end plates to seal the module. The feed fluid passes through holes in the end plate, and into a manifold formed by holes punched into the membrane and polymer separator sheets. The feed then flows into the cut out sections of the polymer sheets which can be left open or filled with mesh. A portion of the feed passes along the membrane surface and out another manifold hole and a corresponding hole in the end plate. A portion of the feed passes through the membrane, and into an adjacent polymer separator sheet that has a similar open area in it, to accept the permeate fluid. This fluid passes into manifold holes at either ends of the element and out through holes in the end plate. This is commonly known as a plate and frame style of module. It is typified by U.S. Pat. No. 3,993,517 which is another invention of this author.

In the second configuration, a permeate backing fabric is glued to a tube which has holes along the surface. Glue is applied to the edges of the fabric. The fabric is rolled around the tube two or more times. A single membrane sheet is folded in half, with a feed mesh sheet placed between the membrane halves. The folded sheet assembly is placed on the permeate backing fabric, and the entire assembly is rolled around the tube three or more times, until the entire assembly is rolled around the tube. The assembly is then wrapped with tape, end restraints installed, exterior seals applied, placed in a tube, and end plugs with O-rings installed in the ends of the tubes. Feed is passed through one end of the element through the mesh separating the membranes and discharged out the other end. A fluid passes through the membrane, into the permeate backing fabric, and into the central permeate tube where it exits out the end block of the element at either or both ends. This type of design is called a spiral wound type of element because the membrane, mesh, and permeate backing fabric is spirally wrapped around a central permeate tube. The feed flow passes straight through the element, parallel to the permeate tube, while the permeate spiral inwards in the permeate backing fabric towards the permeate tube. It is typified by U.S. Pat. No. 3,367,504 which is an invention of J. C. Westmoreland.

Another variation of the spiral wound device is U.S. Pat. No. 4,814,079 which is another invention of this author. In this design, the feed flows in the direction of the spiral, back and forth across the membrane surface. The feed separator is an open path, formed by solid strips of polymer, which defines the feed fluid path, instead of the typical sheet of mesh. In this device, the feed velocity can be increased by a factor of six, while having the same feed flow rate and pressure drop as the conventional type.

The third basic design utilizes a pleated crossflow membrane design, and is typified by U.S. Pat. No. 3,386,583 invented by U. Merten. In this device, a flat sheet membrane is bounded by a feed mesh and a permeate backing fabric. The sandwich is pleated around a central permeate tube. The pleated assembly is rolled and wrapped with tape, to compress the assembly, seals are applied to the outside surface, and it is inserted into a tubular shell. The feed flow mesh is positioned on the shell side of the membrane, and the permeate backing fabric is positioned on the permeate tube side. The feed flows into the shell at one end of the element and passes through the mesh along side the membrane surface. A portion of the feed passes through the membrane, into the permeate backing fabric, and into the central permeate tube, where it exits out the end plate of the element at the opposite end.

The pleated crossflow device invention described above was filed with the Patent Office on Jun. 11, 1965. The device has not been employed as a commercial product. Ultrafiltration and reverse osmosis flat sheet membranes manufactures have used the spiral wound configuration to produce elements for sale. It appears that several factors in the basic design of the pleated crossflow device as described in the patent have favored the use of the spiral wound design, which has led to the abandonment of the pleated crossflow design. The first problem is the complexity of forming the pleats on the mandrel as described in the patent. Rather than have a circular jig to form the pleats around the tube, it is much simpler and quicker to simply wrap the membrane around the permeate tube. It is difficult to pack the maximum number of pleats around the tube with the circular jig. The pleat length has to be adjusted to fit a specific diameter of shell used in its construction. Increasing the pleat length, increases the permeate back pressure. Increasing the shell diameter, to allow the installation of a specific membrane area, decreases the packing density, when the shell is not completely filled. The second problem is one of size. Where it may have been relatively simple to form a small element as the patent describes, the circular jig becomes much more difficult to handle when constructing large elements. This problem can be minimized by increasing the size of the pleat so that fewer pleats are required. The third problem is the fact that the feed passes on the shell side of the membrane, and the feed water tends to bypass the element by flowing along the groves formed by the end of the pleats that contact the shell. The groves could be filled with some type of polymer to prevent bypassing of the feed flow. This would remove some of the effective surface area of the membrane. The element must be completely taped by overlapping the wraps as the element is rolled. The element should be fiberglassed, with glass fiber roving, or tape and a thermosetting resin, over the tape to prevent water from leaking between the wraps of tape. Seals have to be employed between the element and the shell to prevent the bypassing of feed water.

There are significant inherent advantages of the original pleated crossflow element design that were not anticipated by U. Merten in the specification of his patent. This includes the use of high flux membranes, improved packing density, the absence of an antitelescoping device, and an inexpensive permeate backing material. The advantages are related to the short length of the pleat or flap, as compared with the long length of a spiral wound leaf. The pleat can arbitrarily vary from 0.5 to 24 inches in length. It should be kept as short as possible for a specific element diameter, to minimize the permeate back pressure, in the permeate backing material. The length of a spiral wound element leaf is typically from 24 to 60 inches in length. The long length of the spiral wound leaf requires that the permeate carrier be very porous, with a low resistance to the flow of the permeate, or the pressure drop of the carrier will create a significant back pressure beneath the membrane. The back pressure lowers the driving force, which requires that the feed pressure be raised to compensate for the reduced flux rate. This increases the energy required to process the water.

Spiral wound elements use relatively expensive permeate backing materials. They are specially woven fabrics impregnated with epoxy to provide the required porosity and resistance to compaction caused by the compression forces. Reverse osmosis elements operating on seawater have a feed pressure of 800 psi. The seawater has osmotic pressure of 375 psi. This leaves a driving force of 425 psi, which can cause compaction of the permeate backing material, and requires that relatively expensive fabrics be used. The purchased cost of the permeate backing fabric in an RO element can be more expensive than the manufacturing cost of the membrane in the element produced by a membrane manufacturer. Assuming a constant permeate flux rate and the same fiber porosity, the permeate velocity flowing through a 50 inch spiral wound leaf permeate backing fabric is 50 times greater than a one inch pleat, at the permeate tube junction. This means that the permeate backing materials for a pleated membrane, can be made from a denser or thinner polyester or polypropylene spunbound material. They are made of random melt blown fibers, bonded by heat and compression, and are relatively inexpensive to purchase. This is the same type of material typically used for the membrane support material that the membranes are cast or bonded onto its surface. Its use can reduce the materials cost in an element by as much as 30% to 40%.

Using a thinner permeate backing material, or eliminating it entirely, increases the packing density of the element. A typical permeate backing fabric is 0.010" to 0.017" thick, while the membrane with its backing is typically 0.010" to 0.015" thick. The mesh is typically 0.030" thick. A full wrap of a spiral wound element consists of 2 thicknesses of permeate backing fabric, 4 thicknesses of membrane, and 2 thicknesses of mesh. Using the ranges given, each full wrap of a spiral wound element varies from a minimum of 0.120", to a maximum of 0.154" thick. By reducing the permeate backing fabric to 0.005" thick, the wrap thickness corresponding changes to 0.110" and to 0.130" thick. This reduces the wrap thickness from 92% to 84% of the original thickness. By eliminating the permeate backing fabric, the wrap thickness corresponding changes to 0.100" and to 0.120" thick. This reduces the wrap thickness from 83% to 78% of the original thickness. Without a permeate backing fabric, the packing density can be increased from 20% to 28% with the pleated membrane design. More membrane area can be packed into the same size shell which increases its capacity, or the shell size can be reduced, thus reducing costs.

Adding additional membrane area to a spiral wound element is not as simple as adding to the length of the membrane bag. The length of the bag, and the length of the permeate backing fabric in it, is usually at its maximum length for a given flux rate. Adding additional area means adding another leaf to the element. This means sewing on another fabric leaf to the main leaf, which requires additional labor. With small elements, it means shortening the other leafs to obtain the proper total area. With a pleated crossflow element, it means adding additional pleats to the membrane block, or by increasing the length of the pleat. This does not require additional labor.

The short flap length of the pleated crossflow element results in a reduced permeate back pressure allowing membranes with larger pore diameters and higher fluxes, to be used when compared to the capabilities of spiral wound elements. Flat sheet reverse osmosis membranes typically have flux rates of 0.04 to to 0.08 gallons/(day-square foot-psi) which is denoted as GFD/psi. The elements are normally operated in the range of 8 to 25 GFD.

Flat sheet ultrafiltration (UF) membranes typically have flux rates of 0.5 to to 10 GFD/psi. The range pore of diameters is relatively large and is typically expressed as having a range of 0.004 to 0.1 microns or 8,000 to 200,000 molecular weight, on the polysaccharide scale. UF membranes have a normal flux capacity in the range of 30 to 500 GFD, at pressures of 10 to 50 psi, when operating on clean water.

Flat sheet microfiltration (MF) membranes are not normally used with the spiral wound configuration, because of their high flux rates. They are generally available only as flat sheets and conventional pleated cartridges. They typically have a range of pore diameters of 0.1 to 1 microns. Larger pore diameter membranes are usually called filtration membranes. MF membranes have flux rates of 2 to to 200 GFD/psi. They have a normal flux capacity in the range of 100 to 2000 GFD, at pressures of 2 to 20 psi, when operating on clean water.

Spiral wound UF elements are normally operated in the range of 10 to 125 GFD, at pressures of 20 to 50 psi, for 4 inch diameter elements. Larger 8 inch elements have a maximum flux rate of 75 GFD. The limitation in the maximum flux rate is due to their method of construction. A 2.5" diameter element has 1 or 2 leaves. A 4 inch element has 4 to 6 leaves, and an 8 inch element has 12 to 16 leaves. Each leaf is sewn to a single central leaf. This means that all the permeate is funneled into a single permeate backing fabric sheet. This substantially increases the permeate back pressure behind the membrane and limits its flux rate.

A pleated crossflow element, with its short flap length, operates with a low permeate back pressure and allows large pore diameter membranes to be used, including microfiltration membranes. Spiral wound elements should be limited to low flux membranes, which includes, hyperfiltration or reverse osmosis, and nanofiltration elements.

Spiral wound elements require a restraining device, on each end of the element, to prevent telescoping of the membrane bag. The layers or wraps of the bag, around the central permeate tube, are held in place only by friction. When the pressure differential across the element becomes great enough, or the friction supplied by the tightening the element during construction is not strong enough, the bag will extend itself by telescoping without a restraining device. This can restrict the feed flow by warping the membrane and can lead to its failure. This device is commonly called a spider. It is an injection molded piece of plastic that consists of an inner ring that fits over the permeate tube, an outer ring that sometimes holds a brine seal, and radial spokes that support the element. The pleated crossflow element, has very short leafs which can not telescope, and doesn't require spiders.

Objectives and Advantages of the Invention

One of the objects of the present invention is to provide a means of converting flat sheet membrane materials into modular pleated crossflow elements, for the purpose of purification of fluids. Each of the plurality of pleats form an axial channel for the axial feed flow, and an axial channel for the radial permeate flow. The element has a crossflow design that allows most of the fluid to pass through the open end of the element. This creates a lateral velocity of fluid across the membrane surface. A small fraction of the feed passes through the membrane, and out a tubular opening in the exterior shell of the element.

Another objective is to provide a simplified design and method of construction. The design provides for an open ended element to minimize pressure drops. The permeate passes into, and discharges from the shell of the element, instead of from a central tube and end plugs used in a spiral wound element, or in the original pleated design. The open ends provide unrestricted access and discharge of fluids into and out of the element. This eliminates the pressure drop and limited feed flow rates associated with the end plugs, and their narrow entrance and exit holes. This allows the element to operate at its maximum velocity across the membrane surface being limited only by the pressure drop of the feed channel geometry. A central solid rod mandrel assists in the fabrication of the pleated crossflow element although a pleated crossflow element can be fabricated without it.

Another objective is to create a crossflow membrane element that has short, thin, inexpensive, permeate backing material. Inmost cases the the membrane support material inherent in the construction of the membrane provides enough porosity for the permeate flow. Any pressure drop in the permeate backing material limits the potential flux rate of the membranes. The permeate backing material can be eliminated in most cases when using low, medium, and high flux membranes. This can be accomplished when short pleats are used, and the membranes support material has sufficient lateral porosity, and surface roughness. The elimination or minimization of the thickness of permeate backing material allows for a higher packing density than can be achieved by the original pleated crossflow element, or spiral wound designs.

Another objective is to create a pleated crossflow membrane element, whose feed channels contain a feed mesh, that runs the complete axial length of the element. Another pleated crossflow element design can be created whose feed mesh extends only one inch from the start and the finish of the feed channels. The center of the feed channels are empty, or contain short strips of mesh. The objective is to reduce the pressure drop, and/or increase the velocity of the fluid in the feed channels.

Another objective is to create a simplified pleated crossflow membrane element design that eliminates end plugs, fabricated seals, O-rings, and anti-telescoping devices. This reduces the cost, labor, and parts count associated with those devices.

Another objective is to create a membrane element that uses flattened tubular membranes with a feed mesh inside the tube, to define and maintain the feed channel geometry when its compressed. Large membrane tubes, with diameters from 0.5 to 24 inches, and having a thin spunbound fiber backing, can be formed into an element in the same manner as the pleated crossflow elements. The membrane tubes can be manufactured by various methods, including fabrication from flat sheet membrane stock.

The fluids, that the elements of the invention can process, can be composed of water, or organic based solutions, or gases. The fluids pass into one end of the element. They then pass along the surface of the membrane, and exit in a concentrated form, at the opposite end of the element. A portion of the fluid passes through the membrane, in a purified form, and exits out an opening in the shell of the element. The flat sheet, or tubular membranes, can be of any type. This includes reverse osmosis (hyperfiltration), nanofiltration, ultrafiltration, microfiltration, filtration, pervaporation, membrane distillation, and gas permeation types. The materials in the fluids to be separated can include particulates, salts, organic micelles, gases and vapors.

The shell of the wrapped element becomes an integral part of the completed element, since it is glued in place within the shell. Completed elements can be connected in series by connecting the housings of the tubular shells together by couplers. End connections can be threaded or groved, and connected by clamps. The permeate from the element is discharged from a tube extending through the surface of the shell. This facilitates the analysis of the quality of the permeate of each element in a system where many elements are used. The permeate from numerous elements can be collected by a header. In a spiral wound design, where up to six elements are in a single shell, the permeate from the elements is collected in a central tube and mixed together. This makes it difficult to determine if a single element is performing poorly.

DRAWING FIGURES

In the following descriptions, FIGS. 1a to 1d, show the fabrication steps of a three ply pleated crossflow element. FIG. 1a shows the layup of the three plies of mesh, membrane, and permeate support material being pleated. FIG. 1b shows the pleated layup compressed into a block. FIG. 1c shows the pleated layup block wrapped around a solid red to form an assembly. FIG. 1d shows the pleated layup assembly, spirally compressed around the rod to form a compressed pleated assembly, ready for wrapping with tape, and insertion into a shell.

FIGS. 2a and 2b, show the fabrication and completion of any of the pleated crossflow or tubular elements of the other figures. FIG. 2a shows the wrapping of the compressed pleated assembly with mesh and tape. FIG. 2b shows the wrapped compressed pleated assembly inserted into a shell.

FIGS. 3a to 3e show the fabrication steps of a multiple flat tubular element. FIG. 3a shows a tubular membrane with the active membrane surface on the inside, and a strip of mesh inserted within the tube. FIG. 3b shows the compressed tubular membrane of FIG. 3a. FIG. 3c shows a series of tubular membranes compressed into a block. FIG. 3d shows the block of tubular membranes glued together, and wrapped around a solid rod to form an assembly. FIG. 3e shows the tubular membrane assembly, spirally compressed around the rod to form a compressed assembly, ready for wrapping with tape, and insertion into a shell. FIGS. 4a to 4d, show the fabrication steps of a one and one half ply pleated crossflow element. FIG. 4a shows the layup of a sheet of membrane, with strips of mesh being inserted on the active membrane surface, between the pleats. FIG. 4b shows the pleated layup compressed into a block. FIG. 4c shows the pleated layup block wrapped around a solid rod to form an assembly. FIG. 4d shows the pleated layup assembly, spirally compressed around the rod to form a compressed pleated assembly, ready for wrapping with tape, and insertion into a shell.

Figure 5B:
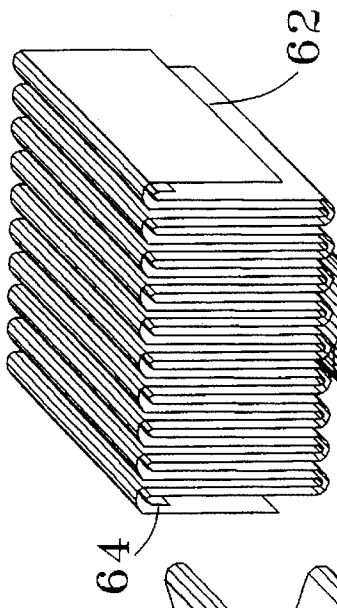
Figure 5C:
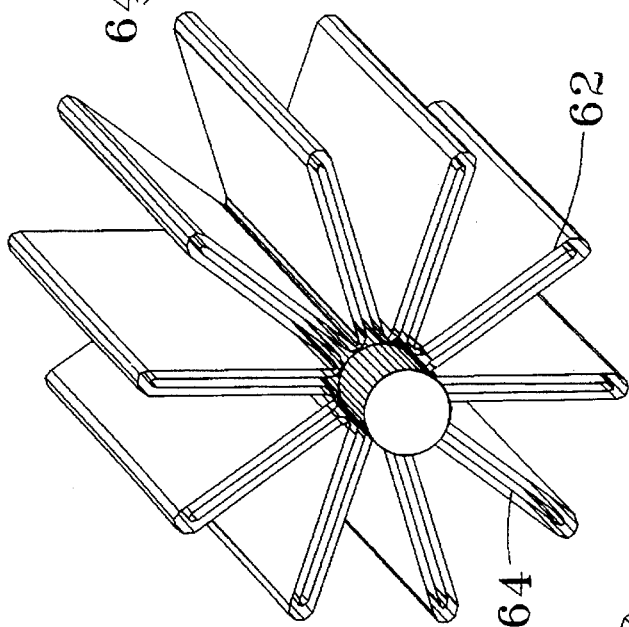
Figure 5A:
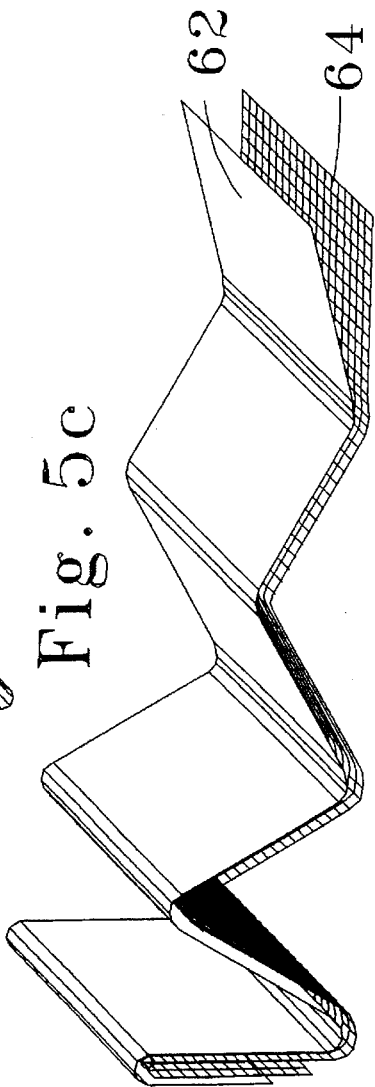
Figure 5D:
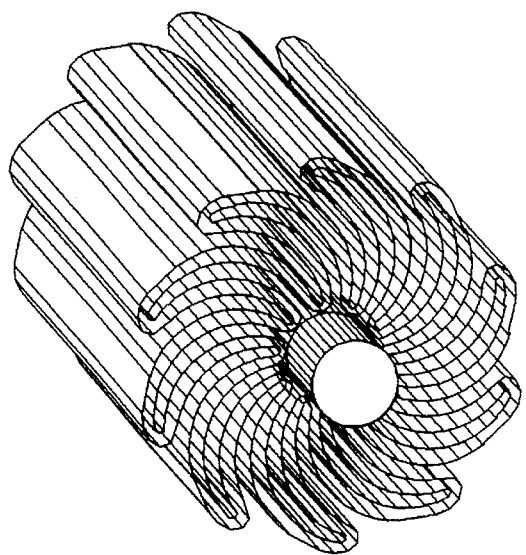

FIGS. 5a to 5d, show the fabrication steps of a two ply pleated crossflow element. FIG. 5a shows the pleated layup of a sheet of membrane, with a sheet of mesh being laid on the active membrane surface. FIG. 5b shows the pleated layup compressed into a block. FIG. 5c shows the pleated layup block wrapped around a solid rod to form an assembly. FIG. 5d shows the pleated layup assembly, spirally compressed around the rod to form a compressed pleated assembly, ready for wrapping with tape, and insertion into a shell.

FIGS. 6a to 6d, show the fabrication steps of a two and one half ply pleated crossflow element. FIG. 6a shows the pleated layup of a sheet of membrane, with a sheet of mesh being laid on the active membrane surface, and strips of a permeate support material being inserted between the pleats on the opposite side of the membrane. FIG. 6b shows the pleated layup compressed into a block. FIG. 6c shows the pleated layup block wrapped around a solid rod to form an assembly. FIG. 6d shows the pleated layup assembly, spirally compressed around the rod to form a compressed pleated assembly, ready for wrapping with tape, and insertion into a shell.

Figure 7A:
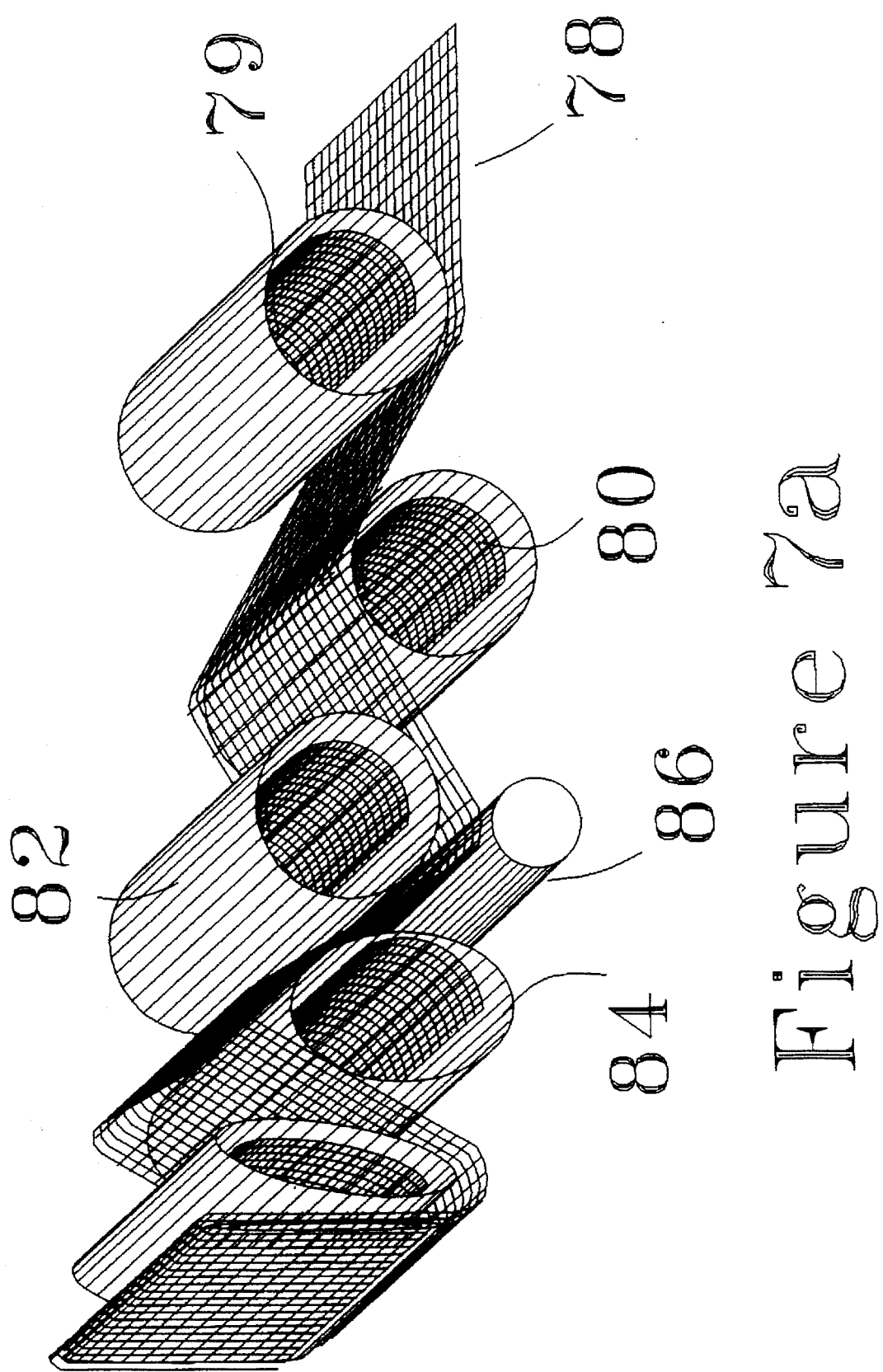

FIG. 7a shows a series of tubular membranes with the active membrane surface on the inside, and a strip of mesh inserted within the tube. A pleated strip of permeate support material retains the tubular membranes and assists in their attachment to the solid rod. All of the figures above, except for 2a and 2b, are short sections showing the ends of the elements.

DESCRIPTION-FIGURES 1aTO 7a

The first form of the invention is described as follows in FIGS. 1a to 1d. In FIG. 1a, a flat sheet membrane 2 is laid over a spacer material 4, made of a plastic mesh, that forms the raw water channel on the membrane surface. Optionally, an inexpensive permeate backing material 6, made of spunbound polymer fibers or fine mesh, is laid on the permeate side of the membrane 2. The membrane is composed of the actual membrane surface 3 bonded to a flexible membrane support material 5. The membrane 2 is aligned so that its active membrane surface 3, is facing the mesh spacer material 4. The layered assembly 1 is continuously pleated on a machine (not shown) and cut into blocks 8, which is a series of stacked pleats of the three materials, in FIG. 1b. A solid plastic rod 10, or a tube plugged at both ends 10, is cut to the length of the element 15, plus two or three extra inches. The rod 10 is placed on a jig (not shown) with bearings to support the rod 10, so it can rotate. A handle is attached to the rod 10 at one end. The function of the rod 10 is to provide a central support structure for the pleats 9 of the element 15. The diameter of the rod 10 determines the size of the block 8 of pleats that can be positioned around the circumference of the rod. The pleated block 8, is compressed in a jig 7, FIG. 3c, to allow the maximum number of pleats to be used in the element. In FIG. 1b and 1c, a glue is applied to the rod 10, and to the surface 12 of the block 8, with the mesh 4 on its surface. The pleated block 8 is wrapped around the rod 10 so the mesh 4 at the apex of the pleats is glued to the rod 10. In the case of some particularly tough membranes 2, like pelytetrafluoroethylene UF and MF membranes, the membrane 2 can be glued to the rod 10 along with the spacer mesh 4 without tearing. In the case of more fragile membranes 2, polymer monofilaments 16 can be placed in the valleys of the pleats, and wrapped around the rod 10, or through holes in the rod 10, to hold the membrane 2 and permeate backing material 6 in place around the rod 10. The free ends of the pleated block 8 now overlap each other. The spacer mesh 4, and permeate backing material 6, were cut so that they adjoin, but do not overlap. The membrane 2, is cut so that they overlap 14 by at least 1 inch. The two membranes 2, are then glued together to form a seam 14 that is impervious to the fluids being processed. After the glue dried, more glue is applied to the outer one inch edge 17 of the membrane support material 2, and permeate backing material 6, of each end of the assembly. The element 15 is immediately rolled and compressed into a cylinder, as shown in FIG. 1d. This can be accomplished by wrapping several plastic sheets (not shown) around and along the element 15 to form a sleeve, and placing adjustable circular clamps (not shown) at intervals along its length. The pleated assembly is rotated in the sleeve, by turning the rod 10, while the clamps are tightened. This compresses the element 15 to obtain the highest packing density possible, and to maintain a uniform feed channel thickness. After the element 15 has compression set, or conformed to the desired shape, the plastic sleeve is removed and a ⅜" wide filament tape 18, FIG. 2a, is wound around the element 19 to maintain the tightness. The tape 18 is wound so that there is a gap of 1 inch between successive turns of the tape. A porous sheet material 20 is wrapped around the element 19. It allows the permeate access to the permeate discharge tube 30, in the shell 24, of the element 19. The permeate flows along the edges of the tapes 18 & 22, and the groves formed by the outer apex of the pleats. Another layer of tape 22 is applied over the assembly.

The taped element 19 is inserted in a tube or shell 24 that is 0.5" shorter than the element 19. The element 19 is rotated in the tube 24, and an epoxy resin is injected through a hole 26, in the tube 24, at each end to seal the element 19 in the tube. This forms a sealing ring about 1" wide at each end. Some resin extrudes out the ends between the tube 24 and around periphery of the element 19, which indicates that a proper seal has been made. After the resin has hardened, each end of the completed element 19 is trimmed with a knife, to remove the excess resin, and 0.25" of the membrane and supporting materials. This ensures that the feed channels 28 are open to receive fluid flow.

Alternatively, the element 23, can be inserted into a tube 24 that is 2.5" shorter than the element. An epoxy resin is applied to the 1.25" of the exposed outer periphery 25 at the ends of the element 23. A 1" long piece of the same kind of pipe 24, used for the shell 24, is slipped over the resin covered ends 25. After the resin has cured, and the ends are trimmed flush with the shell, pipe fittings with internal or external threads 27, are glued and slipped over the ends of the element 23 so they cover the end rings, and are glued to the end rings and the main tube 24.

The pipe shell 24 can be made of simple polymers, such a PVC or acrylic, for low pressure applications. For high pressure applications, a fiberglass reinforced polyester tube 24 is appropriate. Element end connections can be a simple groove and clamp arrangement, or internally or externally threaded fittings. The internal bore of the tube 24 should have a constant diameter to support the edges of the pleats 9 against the internal pressure of the feed fluid. The shell 24 must also facilitate the transport of permeate from the element 23 to the permeate tube 30 without causing a back pressure, especially when using high flux membranes 2. One method is to drill a series of rows of radial holes around the circumference of the tube 24 near its center. The holes can be from 0.06" to 0.1" in diameter. A tee 32, with an internal relief around the bore near its center provides, a gap between the tube 24 and the body of the tee to collect and discharge the permeate through the hole of the permeate tube 30. The tee 32 covers the holes drilled in the tube 24 and is glued to the tube 24.

FIGS. 3a to 3e show another method of constructing an element 46. It is made of a series of large, thin walled, flattened, tubular membranes 37 with a spacer mesh 36 inside the tubes to define and maintain the feed channel geometry when they are compressed. Large tubular membranes 37, with diameters from 0.5 to 24 inches, and having a thin spunbound fiber membrane support material 35 on the outside of the tubes 37 with the membrane surface on the inside, can be formed into an element 46 in the same manner as the pleated crossflow elements 15. A series of the tubular membranes 37 with a spacer mesh 36 inside are placed in a jig 7 and compressed. In this case, a separate permeate backing material 6 is not used and the spunbound membrane support material 35 serves this purpose. A solid plastic rod 38, or tube plugged at both ends 38, is cut to the length of the element 46 plus two or three extra inches. The rod 38 is placed on a jig (not shown) with bearings to support the rod 38 so it can rotate. A handle is attached to one end of the rod 38. The function of the rod 38 is to provide a central support for the series of membrane tubes 37 that form the element 46. The diameter of the rod 38 determines the size of the block of tubes 42 that can be positioned around the circumference of the rod 38. In FIG. 3c, a glue is applied to the rod 38 and to the surface 40 of the block 42 with the membranes support material 35 on its surface. The block 42 is wrapped around the rod 38, so the membrane support material 35 at the apex of the tubes 37 is glued to the red 38. One of the advantages of this design is that the glue does not contact the membrane surfaces 34. The rest of the assembly procedure is the same as the pleated membrane assembly procedure described in the preceding description.

The simplest form of the invention is described as follows in FIGS. 4a to 4d. In FIG. 4a, a roll of flat sheet membrane 48 is pleated by a commercial pleating machine. A strip of plastic spacer mesh 50 that forms the raw water channel is inserted between the pleats that face the membrane surfaces. The assembly is cut into blocks 52 or a series of stacked pleats 52 shown in FIG. 4b. A solid plastic rod 54, or tube plugged at both ends 54, is cut to the length of the element 58 plus two or three extra inches. The rod 54 is placed on a jig (not shown) with bearings to support the red so it can rotate. A handle is attached to one end of the red 54. The function of the red 54 is to provide a central support for the block of pleats 52 of the element 58. The diameter of the rod 54 determines the size of the block of pleats 52 that can be positioned around the circumference of the rod 54. The pleated block 52 is compressed in a jig 7, FIG. 3c, to allow the maximum number of pleats to be used in the element 58. In FIG. 4b and 4c, a glue is applied to the rod 54 and to the surface 56 of the block of pleats 52 which is composed of membrane 48 and mesh 50 on its surface. This requires that the membrane 48 be tear resistant, and can tolerate the glue used to bond it to the rod 54. An alternative is to glue the strips of mesh 50 to the rod 54 and use a plastic monofilament 60 to secure the membrane pleats 52 to the rod. The pleated block 52 is wrapped around the rod 54, so the mesh 50 between the pleats of membrane 48 is glued to the rod 54. The free ends of the first and last membranes 48, of the pleated block 52 now overlap each other. One of the spacer mesh 50 pieces is eliminated so the mesh 50 is not doubled up in that feed channel. The membranes 48 are glued together to form a seam that is impervious to the fluids being processed. After the glue has dried, more glue is applied to the outer one inch edge of the membranes 48 backing material at each end of the assembly 58. The element 58 is immediately rolled and compressed into a cylinder 58, as shown in FIG. 4d. The rest of the assembly procedure is the same as the pleated membrane assembly procedure described in the preceding description of FIG. 1a to 2b. The advantages of this design are that it produces the highest possible packing density of any flat sheet membrane element design, and it is the most economical method in terms of the cost of materials used in producing the element.

The next form of the invention is described as follows in FIGS. 5a to 5d. It is a little more complex, but has the same packing density when the spacer mesh is one half the thickness, when it is compared to the previous version. In FIG. 5a, a roll of flat sheet membrane 62 is pleated by a commercial pleating machine along with a sheet of plastic spacer mesh 64 that forms the raw water channel. The spacer mesh 64 is laid against the membrane 62 surface. The rest of the assembly procedure is the same as the pleated membrane assembly procedure described in the preceding description of FIGS. 4a to 4d, and 2a to 2b. The advantages of this design are that it produces the highest possible packing density of any flat sheet membrane element design, and it is the second most economical method in terms of the cost of materials used in producing the element. It is more economical in terms of labor cost, since the spacer mesh is pleated along with the membrane, and strips of mesh do not have to be inserted individually into the pleated block.

The next form of the invention is described as follows in FIGS. 6a to 6d. It is more complex, and has a higher packing density than the forms shown in FIGS. 4a to 5d. It is similar to the form of the invention shown in FIGS. 1a to 1d. Instead of using a continuous permeate backing material that is pleated along with the membrane and spacer mesh, strips of the permeate backing material are inserted between the pleats along side the membranes support material. In FIG. 6a, a roll of flat sheet membrane 66 is pleated by a commercial pleating machine along with a strip of plastic spacer mesh 68 that forms the raw water channel. The mesh 68 is laid against the membrane 66 surface. Strips of the permeate backing material 70 are inserted between the pleats 72 along side the membranes support material 74. The rest of the assembly procedure is the same as the pleated membrane assembly procedure described in the preceding description of FIGS. 1a to 1d, and 2a to 2b. The advantages of this design are that it produces a high packing density element FIG. 6d compared to other flat sheet membrane element designs, and allows the use of high flux membranes 70 that use a high density membrane backing material which can have a high lateral permeate back pressure over the pleat length at the high flux rates. It is more expensive in terms of material and labor cost since it requires a permeate backing material 70, and they have to be inserted individually into the pleated block 76.

FIG. 7 shows another method of constructing a pleated element using tubular membranes 79. It is made of a series of large, thin walled, flattened, tubular membranes 79 with a spacer mesh 80 inside the tubes 79 to define and maintain the feed channel geometry when they are compressed. Large tubular membranes 79, with diameters from 0.5 to 24 inches, and having a thin spunbound fiber membrane material 82 on the outside of the tubes 79, with the membrane surface 84 on the inside, can be formed into an element in the same manner as the pleated crossflow elements 15. A series of the tubular membranes 79, with a spacer mesh 80 inside, are placed between both sides of the pleats of a permeate backing material 78, and are placed in a jig 7 and compressed. In this case, a separate permeate backing material 78 is used along with the spunbound membrane support material 82. A solid plastic rod 86, or tube plugged at both ends 86, is cut to the length of the element plus two or three extra inches. The rod 86 is placed on a jig (not shown) in the same manner as the previous elements. A glue is applied to the rod 86 and to the surface of the block with the membranes support material 82 and the permeate backing material 78 on its surface. The block is wrapped around the rod 86 so the membrane support material 82 at the apex of the flattened tubes 79 and the apex of the pleats of the permeate backing material 78 is glued to the rod 86. Some of the advantages of this design are that the glue does not contact the membrane surfaces 84, and the permeate backing material 78 reduces the permeate back pressure of high flux membranes that have very dense membrane support materials 82. The rest of the assembly procedure is the same as the pleated membrane assembly procedure described in the preceding descriptions.

All of the six forms or variations of the invention previously described use a spacer mesh to define the dimensions of the fluid feed channel. The spacer mesh also provides some turbulence directed against the membrane surface. This helps to minimize membrane fouling from particulate materials in the feed fluid. It minimizes concentration polarization of particles and any solutes which are rejected or retained by the membrane. The mesh has backwash regions behind the strands which help to entrain particles and increase concentration polarization. The mesh also imposes a significant pressure drop when passing liquids at relatively low fluid velocities. Typically a thin channel 0.030" thick by 40" long, using a plastic diamond shaped mesh with 10 by 10 strands per inch 0.017" thick, has a pressure drop of 10 psi at 0.75 feet per second using water. While this pressure drop represents from 1% to 4% of the feed pressure of a reverse osmosis element, it can represent 10% to 50% of the feed pressure of an ultrafiltration element, and 50% to 100% of the feed pressure of a microfiltration element. This reduces the transmembrane pressure, or average pressure driving the fluid through the membrane, by a significant degree and increases the operating and capital costs for a system. Reducing the pressure drop characteristics of the feed channel is economically important for ultrafiltration, microfiltration, and filtration elements. The typical method of reducing the pressure drop is to increase the channel thickness while maintaining the same low velocity. This decreases the packing density and lowers the turbulence at the membrane surface. A better solution is to remove most of the mesh from the flow path while maintaining or reducing the channel thickness and increasing the fluid velocity. This is accomplished in the present invention by using narrow strips of the spacer at the entrance and exit of the element instead of a full width mesh as shown in the drawings and the previous description. A one inch wide strip at each end is adequate to define the channel thickness and support its structure during construction and operation. The internal feed pressure keeps the channel open during operation.

Test Element Examples

Test element #20 is an example of the physical and operational characteristics of a medium flux, pleated crossflow element, using an ultrafiltration, 0.02 micron pore diameter, polytetrafluorethylene membrane, with a spunbound polyester membrane support material. It has a shell that is a PVC NP 1" diameter Schedule 40 pipe by 11.75" long with external pipe fittings glued on over its ends. The element consists of a 0.25" by 14" acrylic solid rod with 12, 1" long membrane pleats glued to the rod. The rod is cut to the length of the element after it is constructed. The feed channel is a pleated, 16 by 16 strands per inch, 0.022" thick, polypropylene extruded mesh. This results in a feed path 0.040" thick by 11.5" long when it is folded over by pleating. The effective area of the membrane is 1.71 square feet with a length of 10.5" long by 23.5" wide when unfolded. A permeate backing on the permeate side of the membrane. The membrane backing material serves this purpose.

The element is checked for crossleaks with the fluorocarbon membrane in the dry condition as supplied by the manufacturer. Water does not wet the membrane. Water passes through the element at a feed pressure of 20 psi while inspecting the permeate tube for a flow rate. If any is present, it is from a crossleak. The bubble point or water entry pressure is over 500 psi with this membrane. In this condition, the element can be used as a pervaporation or a membrane distillation element. The element is prepared for the transport of water by soaking it with ethanol, isopropanol, or high concentrations of any alcohol or organic acid or base that is completely miscible with water. A layer of the organic molecules that are used to wet the membrane, are permanently bonded to the fluorocarbon polymer surface, after the membrane is flushed with water. They remain bonded as long as the membrane is kept in a wet condition.

The element was operated on tap water at 25° C. The feed water pressure was set at 22.1 psi and the discharge pressure was set at 15.0 psi. This gave a pressure drop across the length of the element of 7.1 psi and an average pressure of 18.6 psi with a pressure drop of 0.61 psi/inch of feed path. The feed flow rate of the element was 1.085 GPM, producing a permeate flow rate of 5.46 GPH, and a reject flow rate of 0.993 GPM. This gave an average velocity of 0.69 feet per second through the feed channel. The flux rate of the membrane was 76.8 GFD and 4.14 GFD/psi with a conversion factor of 0.086.

The following test is an example of the physical and operational characteristics of a high flux pleated crossflow element using a microfiltration, 0.8 micron pore diameter, polytetrafluorethylene membrane, with a spunbound polyester membrane support material. Test element #18 has the same physical characteristics as test element #20 including the absence of permeate backing material. It has the same type of membrane support material as element #20. The element is checked for crossleaks in the same manner as before. The bubble point or water entry pressure is over 50 psi with this membrane. In this condition, the element can be used as a pervaporation or as a membrane distillation element as long as the operating pressure is lower than the water entry pressure. The element is prepared for the transport of water by soaking it with 100% ethanol.

Test element #18 was operated on tap water at 25° C. The feed water pressure was set at 18.0 psi and the discharge pressure was set at 10.8 psi. This gave a pressure drop across the length of the element of 7.2 psi and an average pressure of 14.4 psi with a pressure drop of 0.62 psi/inch of feed path. The feed flow rate of the element was 1.406 GPM, producing a permeate flow rate of 40.6 GPH, and had a reject flow rate of 0.771 GPM. This gave an average velocity of 0.73 feet per second through the feed channel. The flux rate of the membrane was 533 GFD and 37.1 GFD/psi with a conversion factor of 0.451.

Advantages of the invention

A summary of the inherent advantages of the original pleated crossflow element design over the spiral wound design includes the use of high flux membranes, improved packing density, the absence of an antitelescoping device, and material cost savings by using an inexpensive permeate backing material. The advantages are related to the short length of the pleat compared with the long length of a spiral wound leaf. The advantages of the present invention over the original pleated crossflow element design and the spiral wound design include a simplified design and method of construction, an open end element, permeate discharging from the shell of the element, the absence of end plugs, unrestricted access and discharge of fluids, reduced pressure drop of the fluids passing through the element, absence of a permeate backing material, a higher packing density, feed channels that are nearly empty and contain short strips of mesh, elimination of fabricated seals, O-rings, the highest possible packing density of any flat sheet membrane element design, the use of flattened tubular membranes and reduced materials cost.

It is to be understood that various modifications and changes will be apparent to those skilled in the art from the foregoing description. Such modifications are deemed to be within the scope of the claims of this invention. Although the description above contains many specificities, these should not be construed as limiting the scope of the invention, but as merely providing illustrations of some of the presently preferred embodiments of this invention. For example, the shell could have an octagonal crossection, instead of the circular crossection of a tube. The permeate outlet in the shell can be located any where along the length of the tube except in the sealing regions. A tee doesn't have to be used to collect the permeate. A simple hole in the shell or a tube glued in the shell serves this purpose.

Thus the scope of the invention should be determined by the appended claims and their legal equivalents, rather than by the examples given in the description.

What I have claimed is:

1. A semipermeable membrane fluid separation device for the separation and concentration of two or more components of a fluid into two fluid streams, with a portion of said fluid retained on one side of said membrane and enriched in one or more of said components and passed out of said device, and said remaining fluid passing through said membrane and depleted of one or more of said components and passed out of said device, said device comprised of a central solid rod, a flat sheet membrane layup, and a tubular shell, said membrane layup consisting of a semipermeable elongated membrane sheet comprised of a membrane surface attached to a laterally coextensive sheet of porous membrane support material, said membrane being repeatedly folded to form a plurality of convoluted pleats, and including a porous spacer material disposed between said membrane surfaces of said pleats, said pleats aligned with their axes parallel to the axis of said solid rod and disposed with said spacer material and said membrane surface side towards said solid rod and wrapped radially around said solid rod to produce a radial pleat assembly, laterally opposing free ends of said membrane sheet of said radial pleat assembly are joined together by a sealing means to form a fluid resistant bond, a sealing means is applied to said membrane support material on each end of said radial pleat assembly to form a fluid resistant bond, said plurality of pleats being wound about the axis of said solid rod and held in place by a porous sheet material to form a fully wrapped assembly which is inserted into said tubular shell having a depleted fluid outlet, a sealing means is applied to the end edges of said fully wrapped assembly and said tubular shell to form a fluid resistant bend which creates a completed crossflow pleated membrane element, wherein said fluid to be treated passes into an open end of said completed element and passes into said spacer material of said plurality of pleats disposed between said membrane surfaces of each pleat with a portion of said fluid passing through said membrane and into said membrane support material with said depleted fluid passing between said fully wrapped assembly and the inner surface of said tubular shell and passing out of a hole in the side of said tubular shell while said enriched fluid passes out said spacer material at the opposite open end of said completed element.

2. A semipermeable membrane fluid separation device for said separation and concentration of two or more components of a fluid into two fluid streams, with a portion of said fluid retained on one side of said membrane and enriched in one or more of said components and passed out of said device, and said remaining fluid passing through said membrane and depleted of one or more of said components and passed out of said device, said device comprised of a central solid rod, a flat sheet membrane layup, and a tubular shell, said membrane layup consisting of a semipermeable elongated membrane sheet comprised of a membrane surface attached to a laterally coextensive sheet of porous membrane support material, said membrane being repeatedly folded to form a plurality of convoluted pleats, and including strips of a porous spacer material disposed between said membrane surfaces of said pleats, and including strips of porous backing material disposed between said membranes porous support material surface, said pleats aligned with their axes parallel to the axis of said solid rod and disposed with its spacer material and membrane side towards said solid rod and wrapped radially around said solid rod to produce a radial pleat assembly, opposing free ends of said membrane sheet of said radial pleat assembly are sealed together to form a fluid resistant bend, a sealing means is applied to said membrane support material and to said backing material on each end of said radial pleat assembly to form a fluid resistant bend, said plurality of pleats being wound about the axis of said solid rod and held in place by a porous sheet material to form a fully wrapped assembly which is inserted into a tubular shell having a depleted fluid outlet, a sealing means is applied to the end edges of said fully wrapped assembly and said tubular shell to form a fluid resistant bond creating a completed crossflow pleated membrane element, wherein said fluid to be treated passes into said open end of said completed element and passes into said spacer material of said plurality of pleats disposed between said membrane surfaces of each pleat with a portion of said fluid passing through said membrane and into said membrane backing material with said depleted fluid passing to the inner surface of said tubular shell and passing out of a hole in the side of said tubular shell while said enriched fluid passes out said spacer material at said opposite open end of said element.

3. A membrane fluid separation device for said separation and concentration of one or more minor components of a fluid into two fluid streams, with a portion of said fluid retained on one side of said membrane and enriched in said minor components, and a remaining fluid passing through said membrane and depleted of said minor components, said device comprised of a central solid rod, a layup comprised of a pleated sheet of porous backing material, a plurality of semipermeable membrane tubes comprised of a tube of porous membrane support material enclosing and attached to an axially coextensive tubular membrane surface, including a laterally coextensive sheet of porous spacer material disposed within said tubular membrane, said tubular membranes axially coextensive disposed within and on one surface of said pleats of said permeate backing material and in contact with said tubular membranes porous support material surfaces, said plurality of tubular membrane layups of the appropriate number compressed with their axes aligned parallel and laterally with each other to form a tubular block of layups, said block of tubular layups aligned with their axes parallel to the axis of said solid rod and said tubular block disposed with said porous backing material side towards said solid rod and wrapped radially around and attached to said solid rod to produce a radial tube assembly, a sealing means is applied to the end edges of said membrane support material and to said pleated backing material on each end of said radial tube assembly to form a fluid resistant bond, said radial tube assembly being spirally wound about the axis of said solid rod and held in place by a porous sheet material to form a fully wrapped assembly which is inserted into a tubular shell, a sealing means is applied to the end edges of said fully wrapped assembly and said tubular shell to form a fluid resistant bond and creates a completed crossflow pleated membrane element, wherein said fluid to be treated passes into said open end of said completed element and passes into said spacer material of said compressed tubes with a portion of said fluid passing through said membrane and into said membrane backing material with said depleted fluid passing to said inner surface of said tubular shell and passing out of a hole in the side of said tubular shell while said enriched fluid passes out said spacer material at said opposite open end of said completed element.

* * * * *